US012187067B1

(12) United States Patent
Bailey

(10) Patent No.: US 12,187,067 B1
(45) Date of Patent: Jan. 7, 2025

(54) ADAPTABLE SIZE THREADED FASTENING SYSTEM FOR FLIP BOOKS

(71) Applicant: P. Andrew Bailey, Vancouver, WA (US)

(72) Inventor: P. Andrew Bailey, Vancouver, WA (US)

( * ) Notice: Subject to any disclaimer, the term of this patent is extended or adjusted under 35 U.S.C. 154(b) by 0 days.

(21) Appl. No.: 18/346,804

(22) Filed: Jul. 4, 2023

Related U.S. Application Data

(60) Provisional application No. 63/389,719, filed on Jul. 15, 2022.

(51) Int. Cl.
*B42F 3/00* (2006.01)

(52) U.S. Cl.
CPC .................................... *B42F 3/00* (2013.01)

(58) Field of Classification Search
CPC ........................................................ B42F 3/00
USPC ...... 281/3.1, 15.1, 21.1, 27.3, 28, 45; 402/4, 402/24, 58, 63, 67, 70, 73, 75, 80 R, 502
See application file for complete search history.

(56) References Cited

U.S. PATENT DOCUMENTS 1,973,789 A * 9/1934 Anderson ............... B42F 13/00 402/80 R
4,278,332 A 7/1981 Eliscu
4,743,048 A 5/1988 Groswith
5,029,997 A 7/1991 Faroudja
6,047,990 A 4/2000 Mogelonsky et al.
8,472,000 B1 6/2013 Lemmon et al.
8,556,563 B2 10/2013 Marsh
2021/0104166 A1 4/2021 Linton

FOREIGN PATENT DOCUMENTS

CN 209876424 U 12/2019
CN 210005841 U 1/2020

OTHER PUBLICATIONS

Mallory Morsa, Everything You Need to Know About Screw Posts, web page—https://www.binding101.com/resource-center/everything-you-need-to-know-about-screw-posts, publication date Feb. 7, 2019.

* cited by examiner

*Primary Examiner* — Justin V Lewis
(74) *Attorney, Agent, or Firm* — Howard Russell

(57) ABSTRACT

System of flip-book binding components, and preferable adaptation tool, for creating a plurality of different size thicknesses of flip book bindings, comprising a threaded screw having an initial length and having a screw head end and an initial threaded tip end, the screw comprising at least one designated intermediate break area to facilitate optional modification of the screw to a different threaded length with a different resulting threaded tip end, the system further comprising a threaded cap nut adapted for threaded receipt and retention of one of the initial threaded tip end and the optional resulting threaded tip end to enable binding of a plurality of given flip book size thicknesses.

17 Claims, 10 Drawing Sheets

ADAPTABLE SIZE THREADED FASTENING SYSTEM FOR FLIP BOOKS

CROSS REFERENCE TO RELATED APPLICATION

The present application claims the benefit and priority of U.S. Provisional Patent Application Ser. No. 63/389,719, filed 15 Jul. 2022.

FIELD OF THE INVENTION

The present invention relates to size-adaptable bindings for sheets of paper, cardstock, or other materials, and more particularly to a system for providing size-adaptable secure bindings for flip books of varying sizes and depending on a given thickness of a particular flip-book's combined sheets.

BACKGROUND OF INVENTION

A flip book is a series of illustrations of an animated scene bound together in sequence so that an illusion of movement can be imparted by flipping through them rapidly. Flip books provide a way for illustrators to create animations for commercial, fun, and hobby purposes.

Flip books are made to comprise many different and varying size thicknesses, since each author is free to incorporate any desired number of pages, or "frames", into the final creation—there being practically no limit to the variation in thicknesses of flip books possible. Further, and for example, an exceptionally long flip book may be broken into a series of flip books, with the limit of the thickness of any one flip book being related to how one may easily and practically hold the flip book in their hands and effectively flip through the pages. Thus, since flip books are made in varying sizes and thicknesses, some having fewer pages to flip through, and some having more pages, it will be appreciated that having a correctly sized thickness binding capable of being readily created by an individual author is desirable to securely bind the sheets of a given size thickness of flip book together. It will be appreciated that a typical range of thickness sizes of flip books may range between about 12.7 mm to 55 mm or larger.

Therefore, one must either have a number of different sizes of binding parts, e.g., binding studs/screws and nuts, to be able to efficiently and securely accommodate binding of differently sized thickness flip books together, or they must have a system for adapting an otherwise uniform supply of flip book binding parts to be readily useable for use in binding flip books of different sized thicknesses, regardless of the ultimate thickness of the flip book to be bound.

A problem with the first solution mentioned above, to have a number of different sizes of binding parts on hand, is that it requires a supply of each of different sizes of binding parts to choose from for a given project, and this may also be more cumbersome to have to select a plurality of the right sizes of binding parts for the project. A problem with the second solution, to be able to adapt an otherwise uniform supply of flip book parts to be readily usable for using binding flip books of different sizes, is that there are no known such systems.

It would be advantageous to have a system for adapting like binding parts to a given flip book thickness so that creators would be enabled in making whatever thickness of flip book they would like.

SUMMARY OF THE INVENTION

In accordance with an aspect and embodiment of the disclosure, there is provided a combination system of flip-book binding components and adaptation tool for creating a plurality of different size thicknesses of flip book bindings. The system comprises a threaded screw having an initial length and having a screw head end and an initial threaded tip end, the screw comprising at least one designated intermediate break area to facilitate optional modification of the screw to a different threaded length with a different resulting threaded tip end.

The system in accordance with this aspect of the disclosure further comprises a threaded cap nut, preferably comprising a shaft portion and an integral head end portion, adapted for threaded receipt and retention of one of the initial threaded tip end and the optional resulting threaded tip end to enable binding of a plurality of given flip book size thicknesses. The system also comprises an adaptation tool for modifying the screw to a different length.

Preferably, the adaptation tool of this aspect and embodiment of the disclosure is a breaker bar-type tool adapted for shortening the screw to a shorter length by breaking the screw at the at least one designated intermediate break area. In accordance with this embodiment, each designated intermediate break area of the threaded screw is positioned to allow breaking between any of a plurality of different segments of the screw. Before breaking of the screw, each designated intermediate break area comprises an at least partially circumferential crosscut groove located at a given length along the longitudinal axis of the screw. Further, the screw is adapted to be broken at the circumferential groove to a particular length shortened shaft and resulting new threaded tip end adapted for being received and retained in threaded fashion by the threaded nut for effectively binding a plurality of given flip book size thicknesses.

Preferably, the adaptation tool of this aspect and embodiment of the disclosure comprises an at least partially hollow member with an opening thereof beginning at an open-ended extent of the at least partially hollow member of the adaptation tool. The opening is adapted to receive insertion of at least a single segment of the screw into the at least partially hollow member of the adaptation tool to facilitate breaking off of a segment of the screw in order to shorten the screw so that, preferably, it won't stick out beyond the thickness of the binding of the flip book.

Alternatively, the opening of the hollowed-out portion of the adaptation tool hollow member is adapted to insert one of a single segment of the screw and a plurality of segments of the screw into the at least partially hollow member of the adaptation tool, to facilitate breaking off one of a single segment and a plurality of segments to shorten the screw. Thus, one end of a hollow shaft of such a hollow member may have an opening length sufficient to receive and break off just one segment, whereas another end of the shaft may be long enough to receive and break off two or more segments at a time.

In such a configuration, or in other configurations, it will be appreciated that the adaptation tool comprises an at least partially hollow member having a plurality of openings, wherein each opening corresponds with a different hollowed length adapted to receive at least one segment of the screw to facilitate breaking the screw at a plurality of different designated intermediate break areas.

Preferably, in accordance with another aspect of the disclosure, each designated intermediate break area of the screw comprises a plurality of opposing chamfered surfaces defining a central break area in the screw. During adaptation of the screw to accommodate a given flip book thickness, one of a segment and a plurality of segments of the screw to be broken off is adapted to be inserted into one of the plurality of openings of the at least partially hollow member portion with the desired central break area of the screw, that is the central break area at the location where the screw is desired to be broken, being aligned at an edge opening of the open-ended extent of the hollow member. By so aligning the central break area with the edge opening, easy breaking off of one or more segments of the screw by flexing the screw just outside of the opening will cause it to break at the desired designated central break area location.

In accordance with another aspect and an embodiment of the disclosure, there is provided a binding component for binding a plurality of different size thicknesses of flip books. The binding component comprises a threaded screw having an initial length and having a screw head end and an initial threaded tip end, the screw comprising at least one designated intermediate break area to facilitate optional modification of the screw to a different threaded length with a resulting new threaded tip end.

In this embodiment, the screw is adapted to be broken with a user's fingers, hands, a clamping tool, a cutting tool, or an at least partially hollow breaker bar-type tool, to shorten the screw to a shorter length by breaking the screw at the at least one designated intermediate break area of the screw, wherein each designated intermediate break area of the screw is positioned to allow breaking of the screw between any of a plurality of different segments of the screw. Before the screw is broken, each designated intermediate break area of the screw comprises an at least partially circumferential groove located at a given length along the longitudinal axis of the screw. Thus, the screw is adapted to be broken at the circumferential groove and to a particular length shortened shaft and resulting new threaded tip end adapted for being received and retained in threaded fashion by a threaded nut for effectively binding a plurality of given flip book size thicknesses.

The screw component of this aspect of the disclosure may be combined with an adaptation tool comprising an at least partially hollow member with an opening thereof beginning at an open-ended extent of the at least partially hollow member of the adaptation tool. The open-ended extent of the at least partially hollow member of the adaptation tool is adapted to have inserted therein at least a single segment of the screw to facilitate breaking off of a segment of the screw in order to shorten the screw. The opening at the open-ended extent of the at least partially hollow member of the adaptation tool of this aspect of the invention is adapted to have inserted therein one of a single segment of the screw and a plurality of segments of the screw to facilitate breaking off of one of a single segment and a plurality of segments to shorten the screw.

Preferably the adaptation tool of this aspect and embodiment of the disclosure comprises an at least partially hollow member having a plurality of openings, wherein each opening corresponds with a different hollowed length adapted to receive therein at least one segment of the screw to facilitate breaking the screw at a plurality of different designated intermediate break areas.

Further, in accordance with this aspect and embodiment, preferably the screw comprises a plurality of opposing chamfered surfaces, each defining a desired central break area in the screw, and wherein one of a segment and a plurality of segments of the screw to be broken off is adapted to be inserted into one of the plurality of openings of the at least partially hollow member portion with the desired central break area being aligned at the open-ended extent of the hollow member to facilitate easy breaking off of one or more segments of the screw. Thus, preferably, each designated intermediate break area of the threaded screw comprises a plurality of opposing chamfered surfaces defining a desired central break area in the screw, and wherein one of a segment and a plurality of segments of the screw to be broken off is adapted to be broken off at a desired central break area.

In accordance with an aspect and embodiment of the disclosure, the binding component further comprises a threaded cap nut adapted for threaded receipt and retention of one of the initial threaded tip end and a resulting new threaded tip end, as a result of breaking of the screw to shorten it, to enable binding of a plurality of given flip book size thicknesses.

In accordance with another aspect and embodiment of the disclosure, any of the aforementioned screw heads and/or cap nuts may be knurled to facilitate hand gripping, application, and tightening of the threaded cap nut onto one of the initial threaded tip end and a resulting new threaded tip end of the screw.

In accordance with yet another aspect of the disclosure, there is provided a binding component adaptation tool adapted for facilitating shortening of a segmented threaded binding screw having a plurality of designated intermediate break areas, adapted for binding a plurality of different size thicknesses of flip books. The adaptation tool of this aspect and embodiment of the disclosure comprises a breaker bar member adapted for shortening the screw to a shorter length by breaking the screw at a desired designated intermediate break area to shorten the screw to a particular length shortened shaft and resulting new threaded tip end adapted for being received and retained in threaded fashion by a threaded nut for effectively binding a plurality of given flip book size thicknesses.

Preferably, the breaker bar member of this aspect of the disclosure further comprises an at least partially hollow member having an opening at an extent of the at least partially hollow member adapted to have inserted therein at least a single segment of the screw into the at least partially hollow member to facilitate breaking off of a segment to shorten the screw. Further, preferably, the at least partially hollow member is adapted to insert one of a single segment of the screw and a plurality of segments of the screw into the at least partially hollow member of the breaker bar member to facilitate breaking off one of a single segment and a plurality of segments to shorten the screw for use in binding any of a plurality of different thicknesses of flip books.

Still further, in accordance with another aspect and embodiment of the disclosure, the binding component adaptation tool preferably further comprises a tightening member, such as with a screwdriver head portion, for tightening the threaded screw into the threaded nut, wherein the breaker bar member comprises a handle adapted for turning the tightening member to turn the threaded screw member to tighten it into the threaded nut. The screwdriver head portion of this aspect of the disclosure may preferably be recessed into a socket of the tightening member for at least partially encompassing a head end of the screw.

The aforementioned various aspects and embodiments of the disclosure provide an effective and easy-to-use means for individual flip book creators to bind a wide range of thickness sizes of flip books using a more limited number of binding component sizes, since each of the threaded screws of the binding components stock is capable of being shortened to an appropriate size that is slightly less than the thickness of the flip book to be bound and capable of being received by a threaded binding nut in order to securely bind the pages of the flip book.

It will also be appreciated by those skilled in the art that there are various possible combinations of the above-described elements and sub-elements for various embodiments of the invention, whether such elements and sub-elements be combined in whole or in part, which may be employed without departing from the scope and spirit of the invention as claimed.

The subject matter of the present disclosure is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

DETAILED DESCRIPTION

Figure 8A:
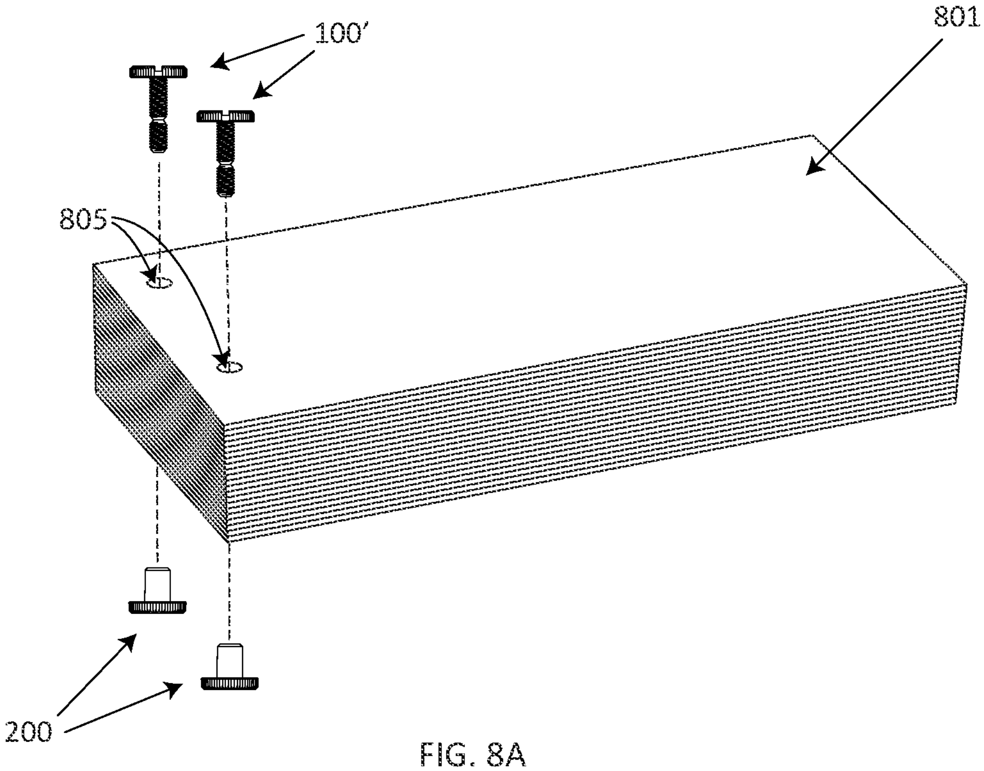
FIG. 8A shows an embodiment of binding components adapted for installation on a flip book, for example of about 12 mm thick, and having shortened threaded screws in accordance with an aspect and embodiment of the disclosure.
Figure 8B:
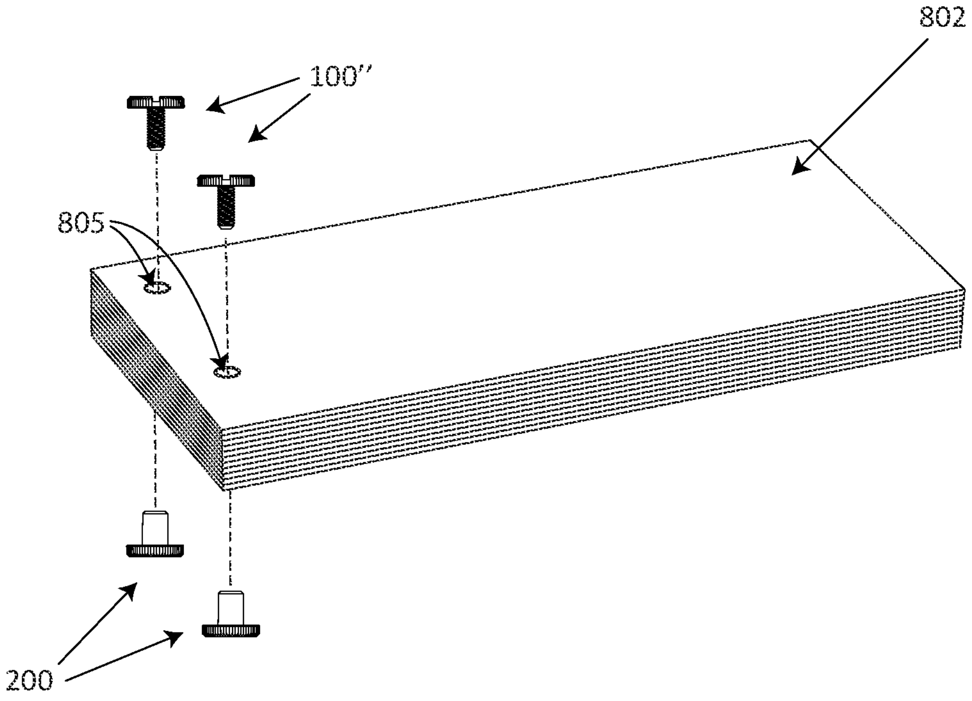
FIG. 8B is another embodiment of shorter binding components than shown in FIG. 8A and adapted for installation on a flip book, for example of about 8 mm thick, in accordance with an aspect and embodiment of the disclosure.

Referring to FIGS. 1A-C and 2A-B, there is provided a binding component 100 for binding a plurality of different size thicknesses of flip books 801, 802 (see FIGS. 8A and 8B). The binding component 100 comprises a threaded screw 100 having an initial length (represented as 120-127, e.g., of a total length of about 45 mm and having a screw head end 104 and an initial threaded tip end 137, the screw comprising at least one designated intermediate break area (represented as 130-137) to facilitate optional modification of the screw to a different threaded length (for example, see different lengths as indicated from 120-123 and 120-121 of FIGS. 9A and 9C respectively) with a resulting new threaded tip end (for example, see threaded tip ends 133 and 131 of FIGS. 9A and 9C respectively).

Figure 1A:
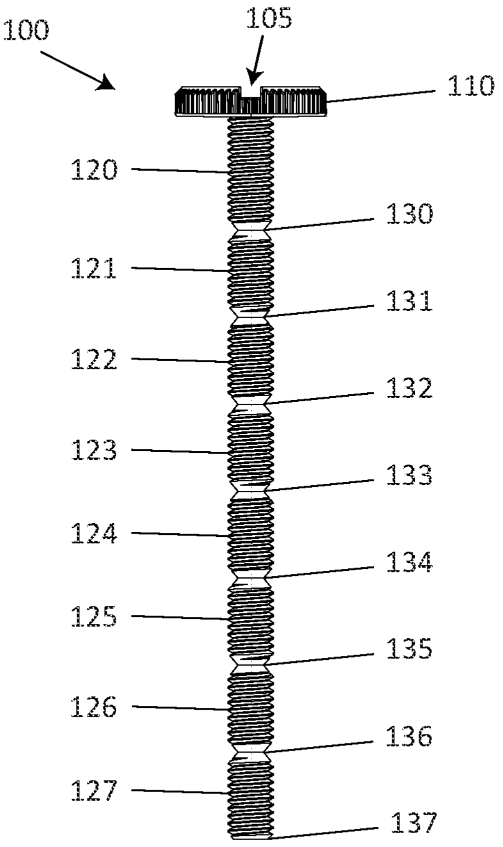
FIG. 1A is a front view of an embodiment of a threaded screw binding component in accordance with an aspect and embodiment of the disclosure.
Figure 1B:
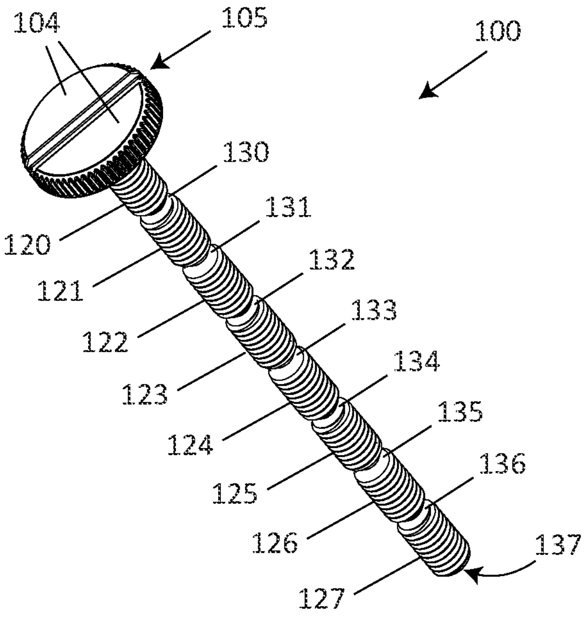
FIG. 1B is a top right perspective view of the threaded screw binding component of FIG. 1A.
Figure 1C:
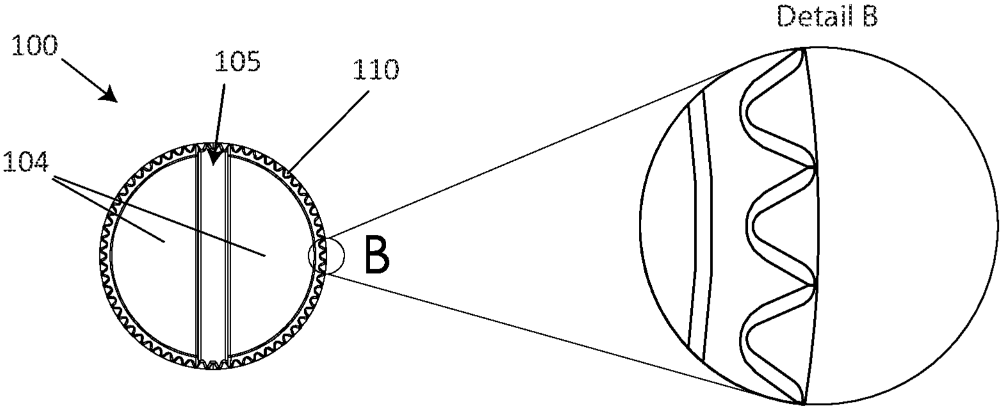
FIG. 1C is a top view of the threaded screw binding component of FIG. 1A, also showing a detailed portion of knurling on a screw head end of the threaded screw binding component.
Figure 2A:
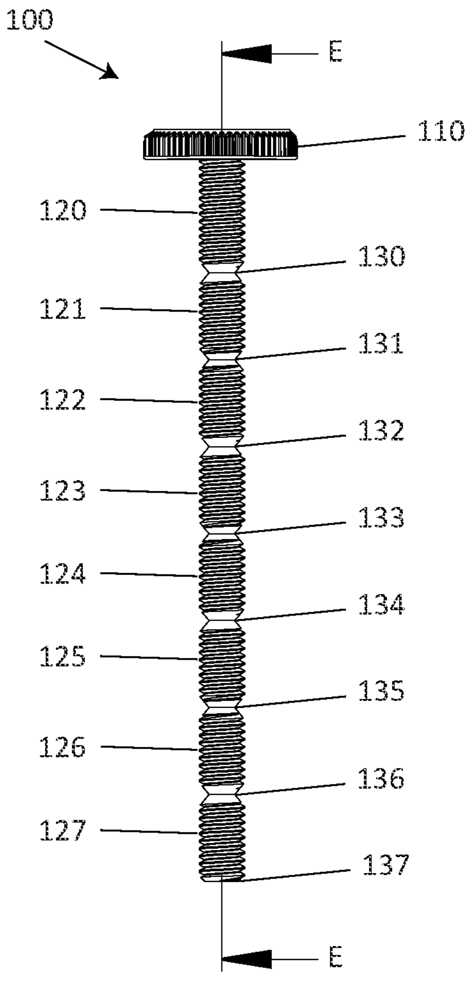
FIG. 2A is a side view of the threaded screw binding component of FIG. 1A, also showing the section line E-E for a subsequent view.
Figure 2B:
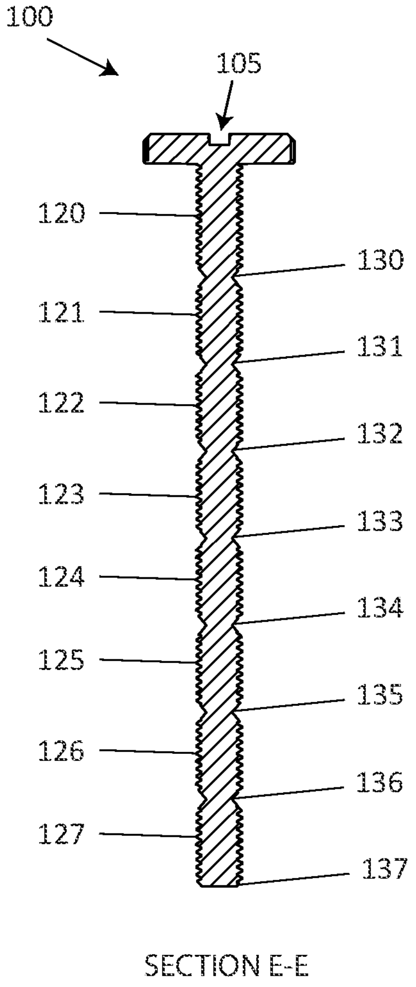
FIG. 2B is a cross-section view of the threaded screw binding component of FIG. 2A taken along section line E-E.
Figure 3A:
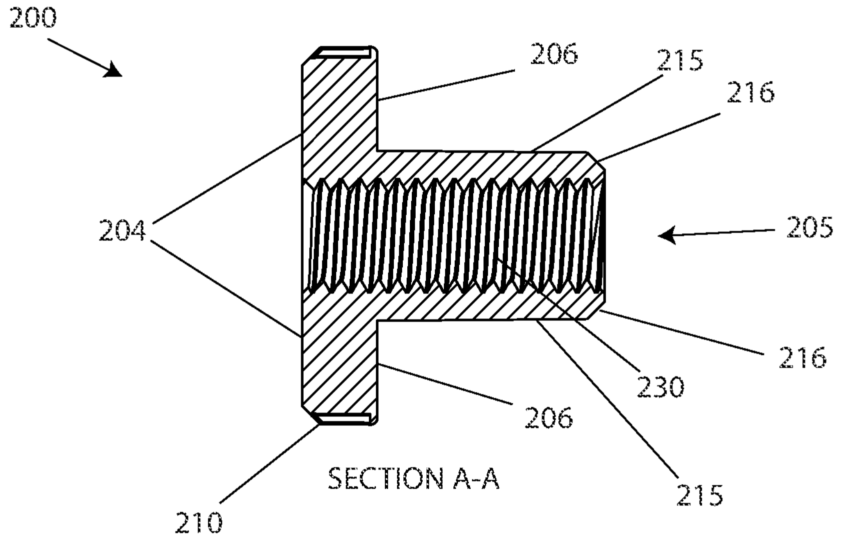
FIG. 3A is a top left perspective view of a threaded nut binding component for a flip book.
Figure 3B:
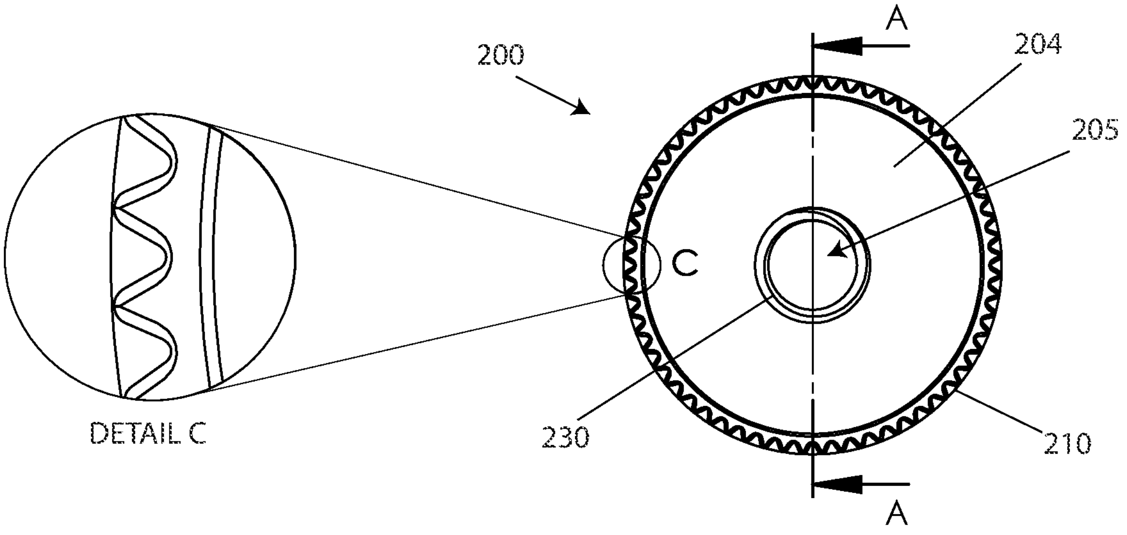
FIG. 3B is a front view of the threaded nut binding component of FIG. 3A.
Figure 4A:
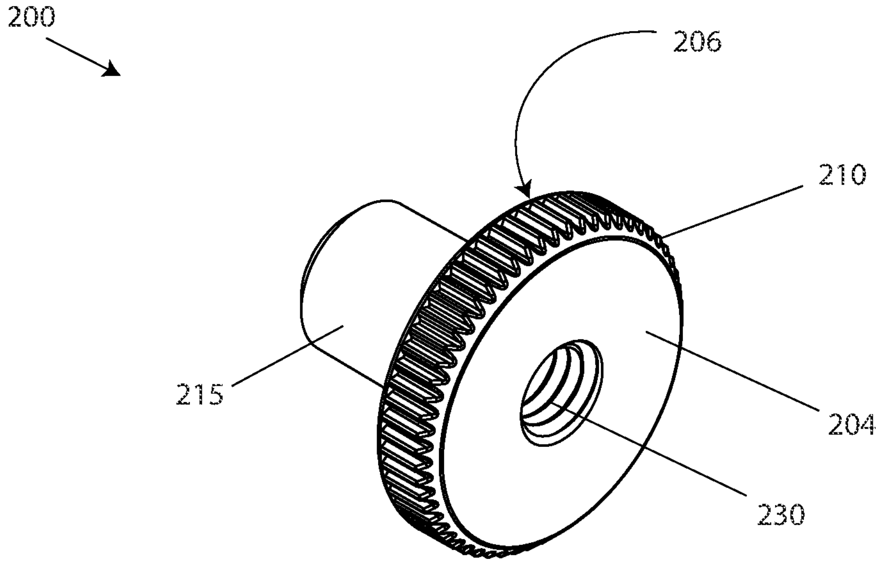
FIG. 4A is a top view of the threaded nut binding component of FIG. 3A, showing the section line A-A for a subsequent view, and also showing a detailed portion of knurling on the threaded nut binding component at Detail C.
Figure 4B:
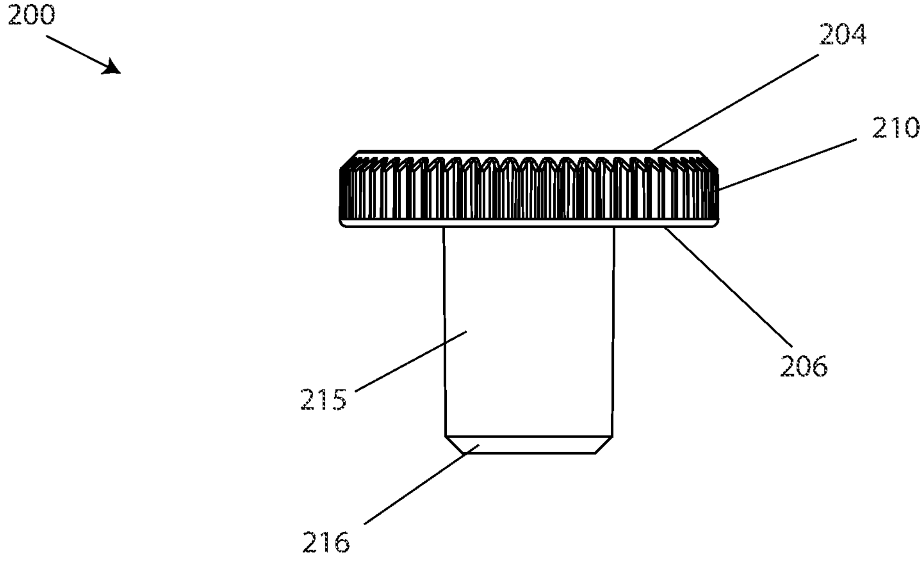
FIG. 4B shows a cross section A-A view of the threaded nut binding component of FIG. 4A.
Figure 5A:
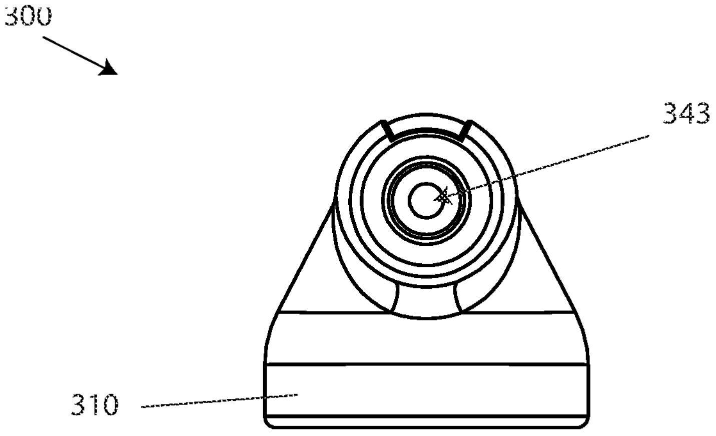
FIG. 5A is front right perspective view of the adaptation tool shown in FIG. 5A.
Figure 5B:
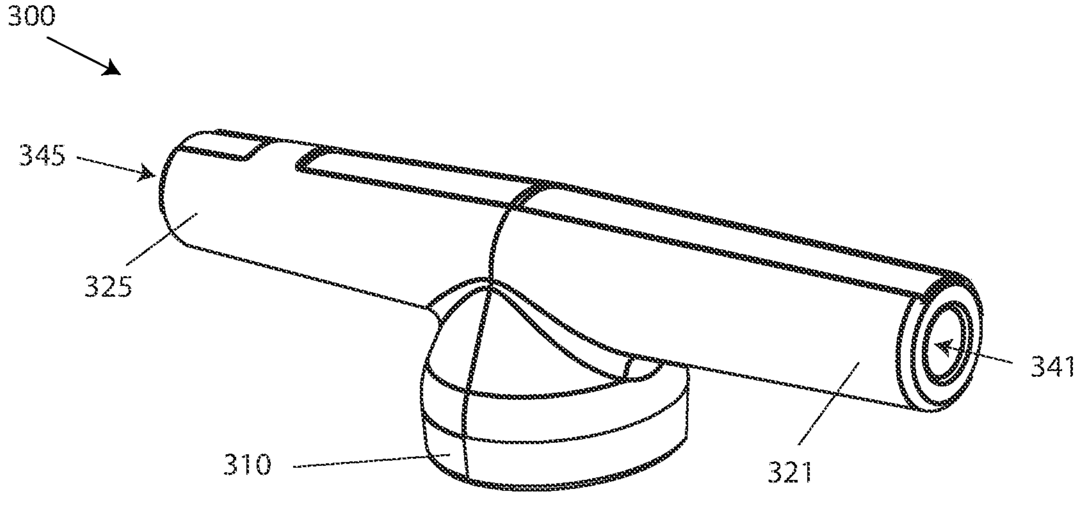
FIG. 5B is right perspective view of an adaptation perspective tool in accordance with an aspect and embodiment of the disclosure.
Figure 9A:
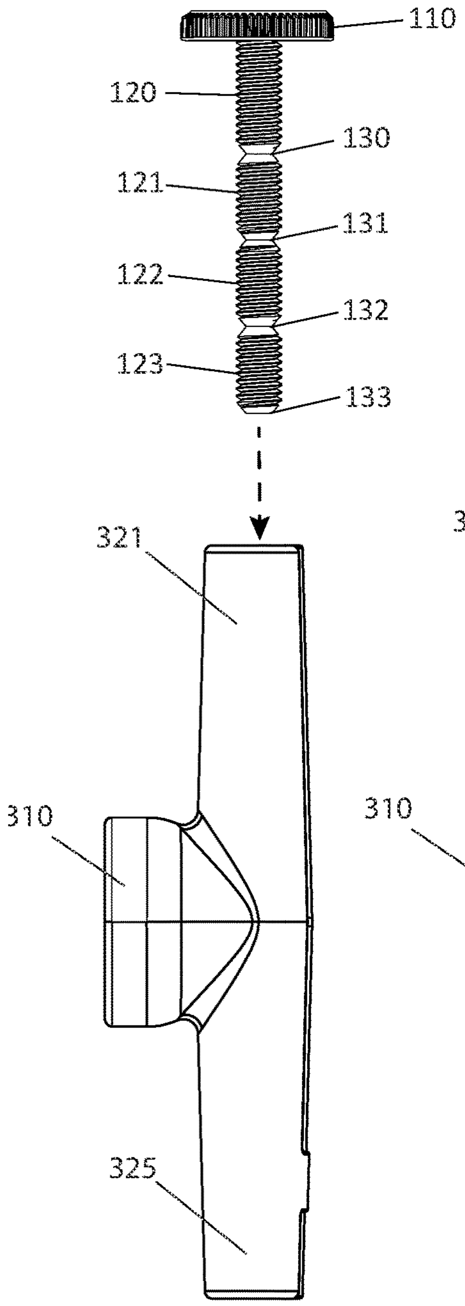
FIGS. 9A-9C show side views of insertion of an embodiment of a threaded screw into an adaptation tool, for breaking of the screw at a desired designated breaking area of the screw to shorten the screw (as shown in FIG. 9C) to be adapted for use in binding a smaller flip book than would otherwise be the case for the screw before it had been broken.
Figure 9B:
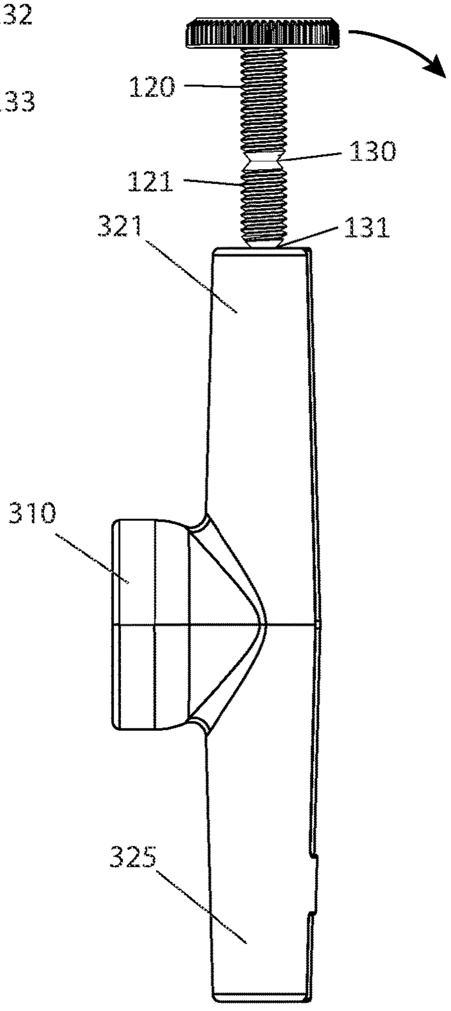
Figure 9C:
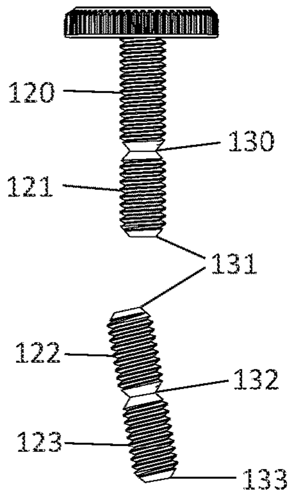

In this embodiment, the screw 100 is adapted to be broken with a user's fingers, hands, a clamping tool (such as a pair of pliers—not shown), a cutting tool (such as scissors or a nipping tool—not shown), or preferably an at least partially hollow breaker bar-type tool 300 (see FIG. 5A), to shorten the screw to a shorter length (e.g., threaded segment lengths 120-123—e.g., about 25 mm long of FIG. 9A—and 120-121—e.g., about 15 mm long of FIG. 9C) by breaking the screw at the at least one designated intermediate break area 130-136 of the screw, wherein each designated intermediate break area of the screw is positioned to allow breaking of the screw between any of a plurality of different threaded segments 120-127 of the screw, wherein each segment may be about 5 mm to 8 mm long, with the first threaded segment 120 optionally being slightly longer (e.g., 5 mm longer) than the other threaded segments 121-127. Before the screw 100 is broken, each designated intermediate break area 130-136 of the screw comprises an at least partially circumferential groove 130-136 located at a given length 120-126 along the longitudinal axis of the screw.

The grooves 130-136 essentially score the diameter of the shaft of the screw 100 such that it is easier to break and makes a cleaner break at the groove. It will be appreciated that the diameter of the screw 100 shaft at each groove 130-136 may be about 2 mm thick, whereas the diameter of the screw at the threads of each segment may be about 4 mm thick. At this ratio of thicknesses, using a plastic or metal alloy threaded screw 100, the binding component 100 will be sufficiently sturdy to withstand the forces necessary to bind a flip book, but likewise sufficiently easy to break to be able to make a clean break using a preferred adaptation/breaking tool 300 (see FIGS. 5A-B, 6A-B, 7A-B) to adapt the screw to an appropriate length relative to the flip book (e.g., slightly less length, for example about 1-3 mm less, than the overall thickness of the flip book).

Thus, the screw 100 is adapted to be broken at any circumferential groove 130-136 and to a particular length (e.g., length indicated by 120-123 of FIG. 9A, or alternatively length 120-121 of FIG. 9B) shortened shaft and resulting new threaded tip end (e.g., tip end 133 of FIG. 9A or tip end 131 of FIG. 9B) adapted for being received and retained in threaded fashion by a threaded nut 200 (see FIGS. 3A-B and 4A-B) for effectively binding a plurality of given flip book size thicknesses (e.g., 801 of FIG. 8A or 802 of FIG. 8B). Thus it will be appreciated that any threaded segment 120-127 may serve as a portion of a threaded tip end 130-137.

Referring specifically to FIGS. 3A-B, and 4A-B, in accordance with another aspect and an embodiment of the disclosure, there is provided a threaded cap nut 200 threaded at 230 and thus adapted for threaded receipt and retention of one of the initial threaded tip end 137 and an optional resulting threaded tip end 130-136 (exposed upon breaking of the initial length 120-127 of the screw down to an intermediate length) to enable binding of any of a plurality of given different flip book 801, 802 (or others not shown) size thicknesses.

The threaded cap nut 200 further comprises a shaft portion 215 for insertion into holes made in flip book pages 801, 802, and a head end portion 204 for capping an outermost page of a flip book. An upper surface of the head end portion 204 may be smooth or decorative. The exterior of the shaft portion 215 may be either cylindrical to correspond with circular-shaped holes cut into flip-books 801, 802, or another shape to correspond with differently-shaped holes cut into flip-books, without departing from the scope of the invention as claimed.

Figure 10:
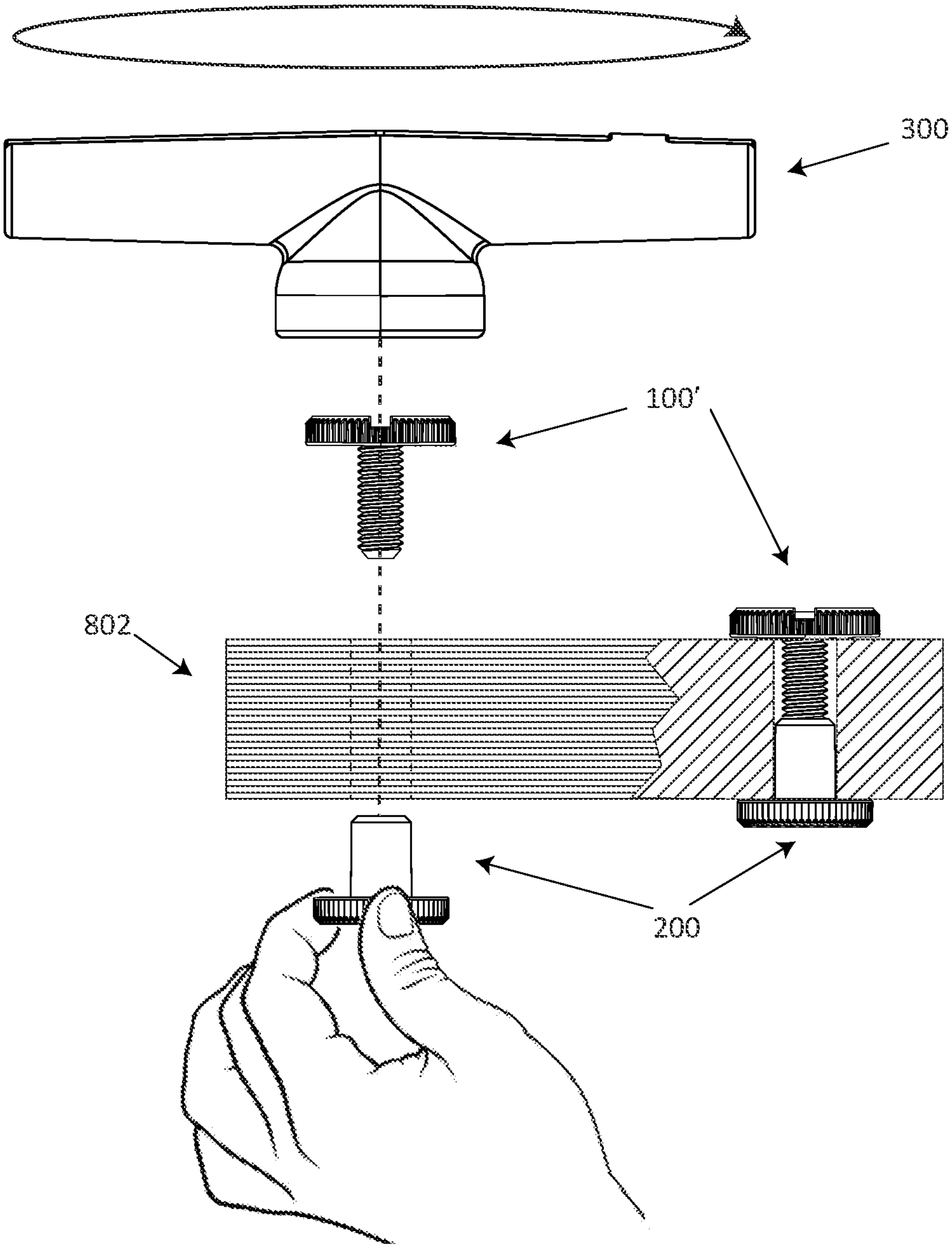
FIG. 10 is a side view illustrating installation of a shortened threaded screw into a threaded nut to securely bind a flip book of a certain thickness.

As shown, the head end 104 of the screw 100 may be flat (or alternatively decorative as with engraving—not shown) to be relatively smooth and flush with a surface of flip book pages 801, 802 when installed on the flip book so that it will not catch on other items, for example if a flip book is stored with other items in a drawer. Similarly the head end 204 of the threaded nut 200 is likewise flat to be relatively smooth and flush with an opposing surface of the flip book pages 801, 802. Further, one or more of the head ends 104, 204 of the screw 100 and threaded nut 200, respectively, may be knurled as shown at 110, 210 to allow a user to more easily hand tighten the binding components 100, 200 as suggested in FIG. 10.

Referring specifically to FIGS. 5A-B, 6A-B, and 7A-B, there is provided a binding component adaptation tool 300 adapted for facilitating shortening of a segmented threaded binding screw 100 having a plurality of designated intermediate break areas 130-136, adapted for binding a plurality of different size thicknesses of flip books 801, 802. The adaptation tool 300 of this aspect and embodiment of the disclosure comprises a breaker bar member 321, 325 adapted for shortening the screw 100 to a shorter length (e.g., length 120-121 of FIG. 9B) by breaking the screw at a desired designated intermediate break area (e.g., break area 130) to shorten the screw to a particular length shortened shaft (e.g., about 8-10 mm as shown in FIG. 8B) and a resulting new threaded tip end 130 adapted for being received and retained in threaded fashion by a threaded nut 200 for effectively binding a plurality of a given flip 802 (or 801) book size thickness.

Preferably, the breaker bar member 321, 325 of this aspect of the disclosure further comprises an at least partially hollow member 321, 325 having an opening 341, 345 at an extent of the at least partially hollow member adapted to have inserted therein at least a single segment 127 of the screw 120 into the at least partially hollow member (e.g., shorter hollow area 345 of portion 325 of breaker bar member 321, 325) to facilitate breaking off of a segment (e.g., segment 127) to shorten the screw.

Further, preferably, the at least partially hollow member 321, 325 is adapted to insert one of a single segment (e.g., segment 127) of the screw 100 and a plurality of threaded segments (e.g., threaded segments 124-127) of the screw into the at least partially hollow member 341 of the breaker bar member portion 321, to facilitate breaking off one of a single segment—e.g., by just using part of the hollow portion 341 by aligning the grooved intermediate break area 136 with the outermost edge of the portion 321 at the opening 341 and flexing the grooved area of the screw against an edge of the breaker bar member portion 321 to make a clean break in the screw—and a plurality of threaded segments—e.g., by using more or all of the hollow portion 341 to align a more central grooved intermediate break area 133 with the edge of the opening 341 to make a clean break in the screw to yield a shorter screw length—to shorten the screw for use in binding any of a plurality of different thicknesses of flip books 801, 802 (or other thickness flip book).

Figure 6A:
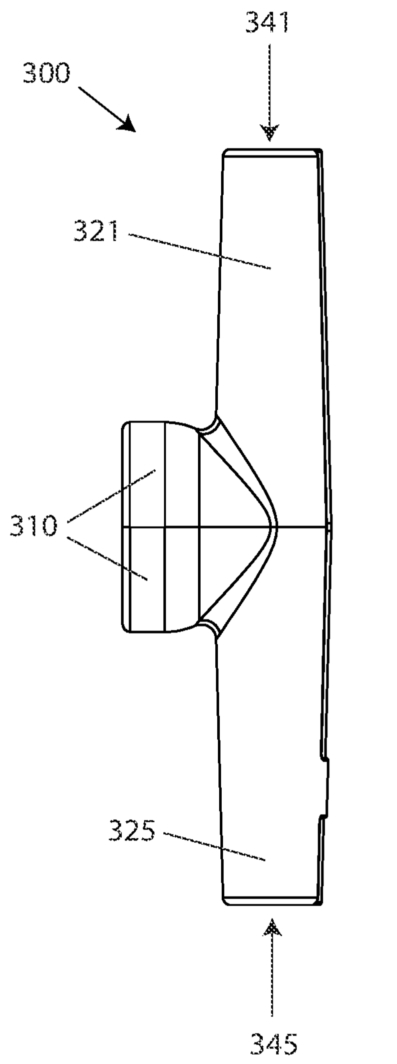
FIG. 6A is a side view of the adaptation tool of FIGS. 5A and 5B.
Figure 6B:
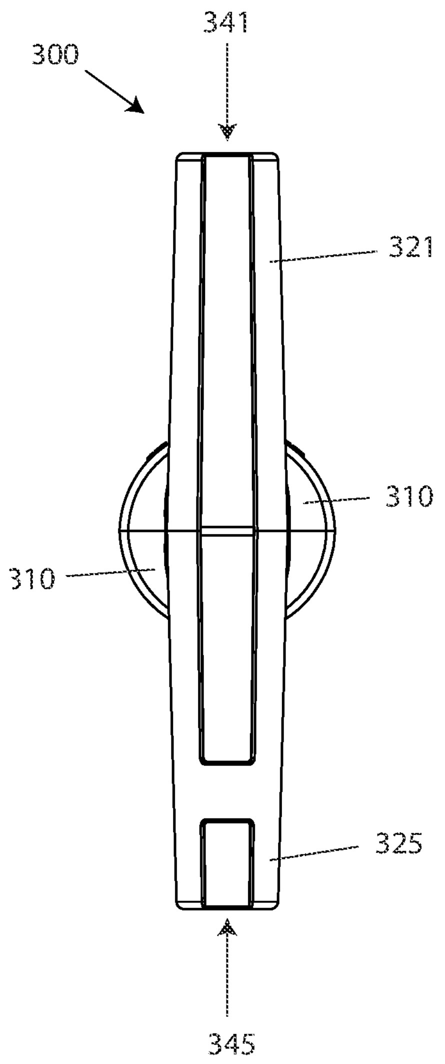
FIG. 6B is a top view of the adaptation tool of FIGS. 5A and 5B.
Figure 7A:
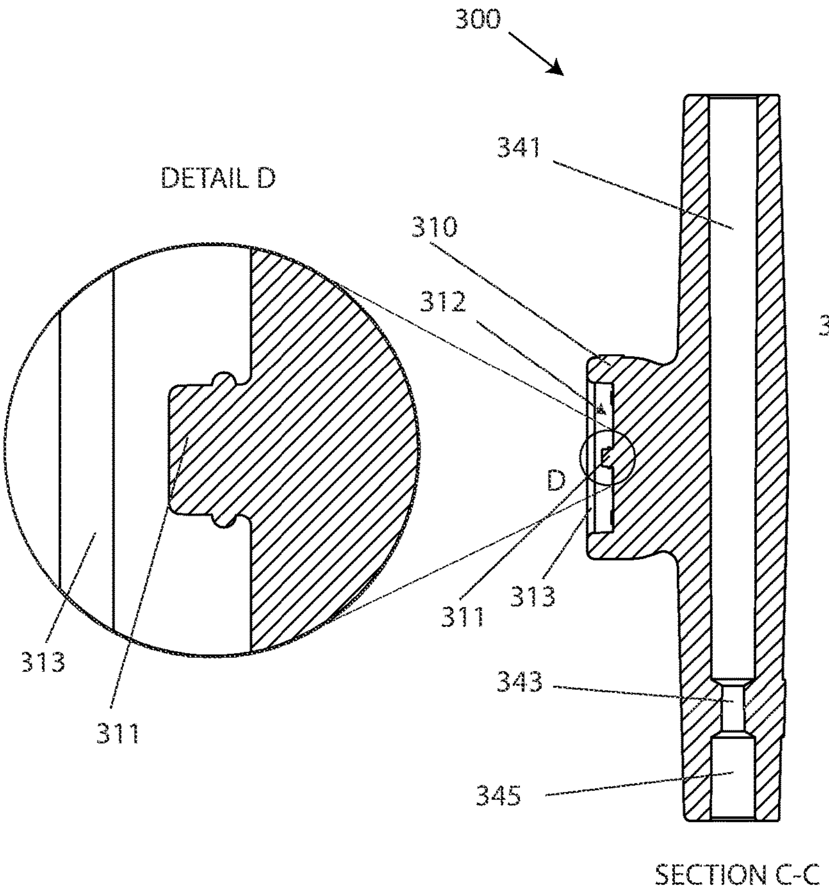
FIG. 7A is a right-side cross section view of the adaptation tool of FIG. 7B.
Figure 7B:
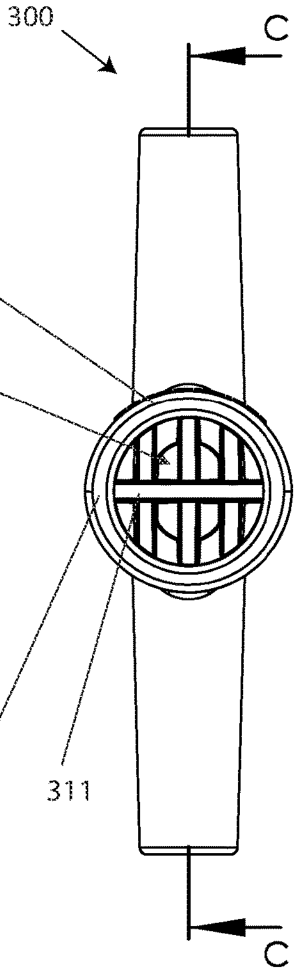
FIG. 7B is a bottom view of the adaptation tool of FIGS. 5A and 5B, and showing section line C-C for FIG. 7A.

As shown in FIGS. 6A and 6B, a visual marking 327 may be given on the exterior of the breaker bar member 321, 325 to indicate which side of the breaker bar member has the shorter hollow portion 345.

Referring more specifically to FIGS. 6A-B and 7A-B, still further, in accordance with another aspect and embodiment of the disclosure, the binding component adaptation tool 300 preferably further comprises a tightening member 310, such as with a screwdriver head portion 311, for tightening the threaded screw 100 into the threaded nut 200, wherein the breaker bar member 321, 325 comprises a handle adapted for turning the tightening member to turn the threaded screw member to tighten it into the threaded nut. The screwdriver head portion 311 of this aspect of the disclosure may preferably be recessed into a socket 312 of the tightening member for at least partially encompassing the head end 104 of the screw 100. Further the socket 312 may be chamfered as shown at 313 to facilitate easy location of the socket over the head end 110 of the screw 100. While a standard screwdriver-type head portion 311 is shown, it will be appreciated by those skilled in the art that a Phillips head-type head portion (not shown) may be used without departing from the scope of the invention as claimed.

The aforementioned various aspects and embodiments of the disclosure provide an effective and easy-to-use means for individual flip book creators to bind a wide range of thickness sizes of flip books using a more limited number of binding component sizes (e.g., a single threaded screw 100 size—e.g., 47.75 mm thick initial size—may be stocked and easily adapted to eight or more potential shorter screw lengths), since each of the threaded screws of the binding components stock is capable of being shortened to an appropriate size that is slightly less than the thickness of the flip book to be bound and capable of being received by a threaded binding nut 200 in order to securely bind the pages of the flip book.

It will also be appreciated by those skilled in the art that there are various possible combinations of the above-described elements and sub-elements for various embodiments of the invention, whether such elements and sub-elements be combined in whole or in part, which may be employed without departing from the scope and spirit of the invention as claimed.

The presently described and claimed apparatus solves issues associated with prior-art apparatus, since it makes it much more convenient to find—without undue searching—and use binding components from and existing stock. The present apparatus improves on prior art apparatus, since it makes it easier for an individual user to enjoy their flip book creations, knowing that they will be securely bound, regardless of the thickness of the given flip book. As such, it will be appreciated that waste may be minimized, since two cap nuts 200 could be used on either side, or both sides, of a broken segment of screw 100 (i.e., in a situation where a segment of screw not having a screw head has resulted from prior uses).

While preferred embodiments of the present invention have been shown and described, it will be apparent to those skilled in the art that many changes and modifications may be made without departing from the invention in its broader aspects. For example, it will be appreciated that one of ordinary skill in the art may mix and match the various components of the various embodiments of the invention without departing from the true spirit of the invention as claimed. The appended claims are therefore intended to cover all such changes and modifications as fall within the true spirit and scope of the invention.

What is claimed is:

1. A combination system of flip-book binding components and adaptation tool for creating a plurality of different size thicknesses of flip book bindings, comprising:

a threaded screw having an initial length shaft and having a screw head end and an initial threaded tip end, said screw comprising at least one designated intermediate break area to facilitate modification of said screw to a different threaded length with a different resulting threaded tip end, wherein each designated intermediate break area comprises an at least partially circumferential groove located at a given length along a longitudinal axis of said screw;

a threaded cap nut adapted for threaded receipt and retention of one of the initial threaded tip end and a resulting threaded tip end to enable binding of a plurality of given flip book size thicknesses; and an adaptation tool for modifying said screw to a different length, wherein said adaptation tool is a breaker bar-type tool adapted for shortening said screw to a shorter length by breaking said screw at the at least one designated intermediate break area, wherein each designated intermediate break area of said threaded screw is positioned to allow breaking between any of a plurality of different segments of said screw, and wherein said screw is adapted to be broken at the circumferential groove by said adaptation tool to a particular shortened length and resulting new threaded tip end adapted for being received and retained in threaded fashion by said threaded nut for effectively binding a plurality of given flip book size thicknesses.

2. The combination system of claim 1, wherein said adaptation tool comprises an at least partially hollow member with an opening thereof beginning at an open-ended extent of the at least partially hollow member of said adaptation tool adapted to insert at least a single segment of said screw into the at least partially hollow member of said adaptation tool to facilitate breaking off of a segment to shorten said screw.

3. The combination system of claim 2, wherein the opening at the open-ended extent of the at least partially hollow member is adapted to insert one of a single segment of said screw and a plurality of segments into the at least partially hollow member of said adaptation tool to facilitate breaking off one of a single segment and a plurality of segments to shorten said screw.

4. The combination system of claim 1, wherein said adaptation tool comprises an at least partially hollow member having a plurality of openings, wherein each opening corresponds with a different hollowed length adapted to receive at least one segment of said screw to facilitate breaking said screw at a plurality of different designated intermediate break areas.

5. The combination system of claim 4, wherein each designated intermediate break area of said screw comprises a plurality of opposing chamfered surfaces defining a desired central break area in said screw, and wherein one of a segment and a plurality of segments of said screw to be broken off is adapted to be inserted into one of the plurality of openings of the at least partially hollow member portion with the desired central break area being aligned at an open-ended extent of said hollow member to facilitate breaking off of one or more segments of said screw.

6. A binding component for binding a plurality of different size thicknesses of flip books, comprising:

a threaded screw having an initial length and having a screw head end and an initial threaded tip end, said screw comprising at least one designated intermediate break area to facilitate modification of the screw to a different threaded length with a resulting new threaded tip end, wherein said screw is adapted to be broken with one of a user's fingers, a clamping tool, and an at least partially hollow breaker bar-type tool to shorten said screw to a shorter length by breaking said screw at the at least one designated intermediate break area, wherein each designated intermediate break area of said screw is positioned to allow breaking between any of a plurality of different segments of said screw, wherein before breaking said screw, each designated intermediate break area comprises an at least partially circumferential groove located at a given length along a longitudinal axis of said screw, and wherein said screw is adapted to be broken at the circumferential groove to a particular shortened length shortened and resulting new threaded tip end adapted for being received and retained in threaded fashion by a threaded nut for effectively binding a plurality of given flip book size thicknesses.

7. The binding component of claim 6, wherein each designated intermediate break area of said threaded screw comprises a plurality of opposing chamfered surfaces defining a desired central break area in said screw, and wherein one of a segment and a plurality of segments of said screw to be broken off is adapted to be broken off at a desired central break area.

8. The binding component of claim 6, further comprising a threaded cap nut comprised of a shaft portion and a head end portion adapted for threaded receipt and retention of one of the initial threaded tip end and a resulting new threaded tip end to enable binding of a plurality of given flip book size thicknesses.

9. The combination binding component and threaded cap nut of claim 8, wherein at least one of the head end of said screw and said threaded cap nut is knurled to facilitate hand gripping, application, and tightening of said threaded cap nut onto one of the initial threaded tip end and a resulting new threaded tip end of said screw.

10. The binding component of claim 6, further comprising an adaptation tool comprising an at least partially hollow member with an opening thereof beginning at an open-ended extent of the at least partially hollow member of said adaptation tool adapted to have inserted therein at least a single segment of said screw to facilitate breaking off of a segment to shorten said screw.

11. The combination binding component and adaptation tool of claim 10, wherein the opening at the open-ended extent of the at least partially hollow member of said adaptation tool is adapted to insert one of a single segment of said screw and a plurality of segments of said screw into the at least partially hollow member of said adaptation tool to facilitate breaking off of one of a single segment and a plurality of segments to shorten said screw.

12. The combination binding component and adaptation tool of claim 6, wherein said adaptation tool comprises an at least partially hollow member having a plurality of openings, wherein each opening corresponds with a different hollowed length adapted to receive at least one segment of said screw to facilitate breaking said screw at a plurality of different designated intermediate break areas.

13. The combination binding component and adaptation tool of claim 12, wherein each designated intermediate break area of said screw comprises a plurality of opposing chamfered surfaces defining a desired central break area in said screw, and wherein one of a segment and a plurality of segments of said screw to be broken off is adapted to be inserted into one of the plurality of openings of the at least partially hollow member portion with the desired central break area being aligned at an open-ended extent of said hollow member to facilitate easy-breaking off of one or more segments of said screw.

14. A binding component adaptation tool adapted for facilitating shortening of a segmented threaded binding screw having a plurality of designated intermediate break areas, adapted for binding a plurality of different size thicknesses of flip books, comprising:

a breaker bar member adapted for shortening the screw to a shorter length by breaking the screw at a desired designated intermediate break area to shorten the screw to a particular length shortened shaft and resulting new threaded tip end adapted for being received and retained in threaded fashion by a threaded nut for effectively binding a plurality of given flip book size thicknesses; and a tightening member, and wherein said breaker bar member comprises a handle adapted for turning said tightening member to turn the screw to tighten it into the threaded nut.

15. The binding component adaptation tool of claim 14, wherein said breaker bar member further comprises an at least partially hollow member having an opening at an extent of the at least partially hollow member to insert at least a single segment of the screw into the at least partially hollow member to facilitate breaking off of a segment to shorten the screw.

16. The binding component adaptation tool of claim 15, wherein the opening at the extent of the at least partially hollow member is adapted to insert one of a single segment of the screw and a plurality of segments of the screw into the at least partially hollow member of said breaker bar member to facilitate breaking off one of a single segment and a plurality of segments to shorten the screw.

17. The binding component adaptation tool of claim 14, wherein said tightening member comprises a screwdriver head portion seated within a recessed socket adapted for at least partially encompassing a head end of the screw.

* * * * *